No. 706,129. Patented Aug. 5, 1902.
I. H. TAYLOR.
ASH SIFTER.
(Application filed Feb. 20, 1901.)
(No Model.)
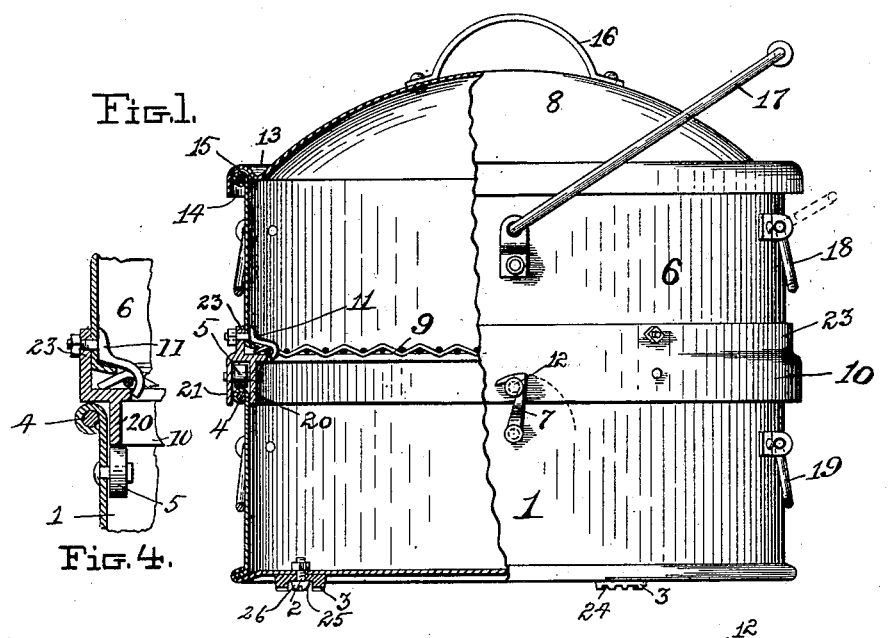
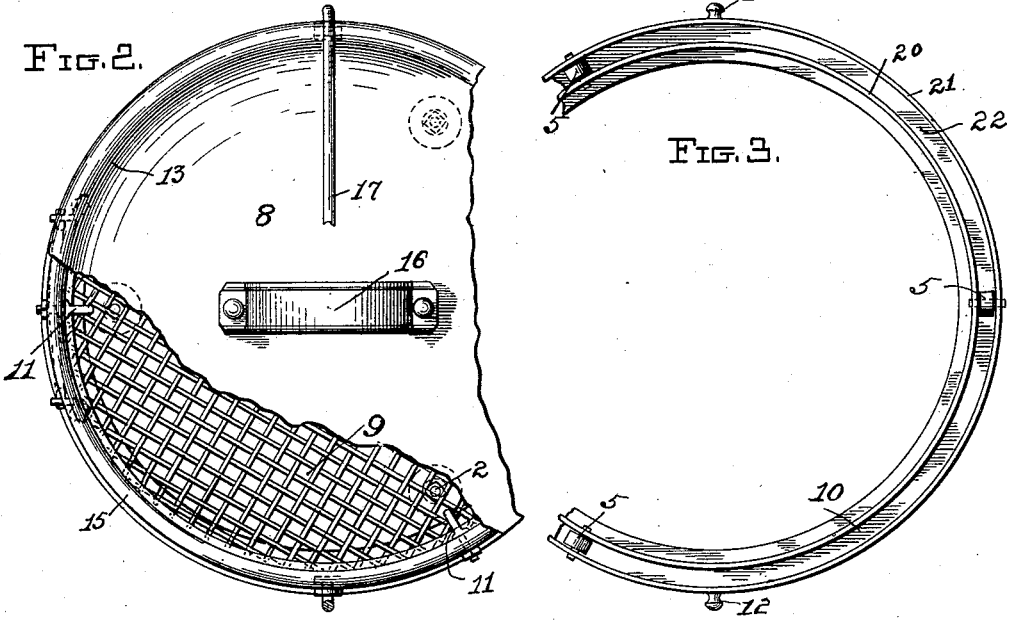
WITNESSES:
A. O. Babendreier
Henry C. Wagoner
INVENTOR:
Isaiah H. Taylor
By Robert Gipson
Atty.

UNITED STATES PATENT OFFICE.

ISAIAH H. TAYLOR, OF BALTIMORE, MARYLAND, ASSIGNOR OF ONE-HALF TO FRANK B. HOOPER, OF BALTIMORE, MARYLAND.

ASH-SIFTER.

SPECIFICATION forming part of Letters Patent No. 706,129, dated August 5, 1902.

Application filed February 20, 1901. Serial No. 48,040. (No model.)

*To all whom it may concern:*

Be it known that I, ISAIAH H. TAYLOR, a citizen of the United States, residing at Baltimore, in the State of Maryland, have invented a certain new and useful Improvement in Ash-Sifters, of which the following is a specification.

This invention relates to an improvement in ash-sifters wherein two sections are employed.

The object of the invention is to provide a device for sifting ashes in the house or other place, if desired, and which will retain therein the dust arising from the ashes when the latter are being sifted.

A further object of the invention is to provide the device with antifriction-bearings to facilitate the reciprocating or revolving of the upper receptacle upon the lower receptacle for the purpose of sifting the ashes contained in the upper receptacle.

In the drawings, Figure 1 is an elevation, partly in section. Fig. 2 is a top view with the lid partly broken away. Fig. 3 is a bottom view of the annular ring which contains the antifriction-bearings. Fig. 4 is a modification of the roller or antifriction bearings, showing the rollers attached to the receptacle 1 instead of to the base or ring 10 of receptacle 6.

The numeral 1 designates a receptacle for the reception of ashes after being sifted, of cylindrical shape, which can be made of any suitable material and any desired size. The receptacle has secured to the bottom thereof by bolts 2 or other suitable means lugs or feet 3 with serrated faces, the serrations of which engage the floor and prevent the sifter from moving or shifting when being used. The receptacle 1 is also provided with an annular flange or guideway 4, on which the roller-bearings 5 of the upper receptacle 6 revolve when the gyratory movement is applied to sift the ashes, and it is also provided with pivoted hooks 7, diametrically opposite each other, to lock the two receptacles 1 and 6 together when it is desired to carry them from place to place. The receptacle 6 is made open at both ends, one end for the reception of a lid or cover 8, the other end for a screen 9, which can be of any mesh desired. The said screen 9 is held in place on the annular flanged base or ring 10 by the milled or turned edge of the receptacle 6 and the hook-headed bolts 11, placed into the meshes of the screen 9 and through the said receptacle 6 and annular flanged base or ring 10 and secured by nuts or other suitable means. The receptacle 6 is also provided with lugs or projections 12, over which the pivoted hooks 7 engage to lock the receptacles together. The receptacle 6 has a dust-proof lid or cover 8, which has convexo-concave grooves 13 14 around the outer edge, the inner or concave groove 13 forming an annular flange or shoulder which fits snugly inside the receptacle 6, the outer or convex groove 14 fitting over and outside the edge 15 of the receptacle 6, making a dust-proof joint. The lid or cover 8 is provided with a grip or handle 16, which is used for removing the lid or cover 8 and also can be used to give the sifter the gyratory motion, owing to the groove 13 snugly fitting the receptacle, for sifting the ashes.

The receptacle 6 is provided with a bail 17, by which the sifter can be carried when locked together by the pivoted hooks 7 and the lugs or projections 12.

The receptacles 1 and 6 are provided with handles 18 and 19, which can be used to carry the receptacles when not locked together and used to impart the gyratory motion to the receptacle 6 to sift the ashes, if desired.

The annular base or ring 10 has two concentric flanges 20 21, that form the annular channel 22, in which the roller-bearings 5 are placed. These annular flanges project over and incase the annular flange or guideway 4 of the receptacle 1. The annular base or ring 10 also has a concentric flange 23, extending upward, to which the receptacle 6 and the screen 9 are secured by the hook-headed bolts 11.

The lugs or feet 2 are provided with sharp serrated surfaces or teeth 24 and made with declivities 25 in their faces for the accommodation of the heads of the bolts 26, by which the feet 2 are secured to the bottom of the receptacle 1. The heads of the bolts 26 being in the declivities 25 do not come in contact with the floor, thereby permitting the serrations 24 on the faces or surfaces of the lugs or feet 2 to engage with or grip the floor and not allowing the sifter to move or shift when being used.

The screen 9 can be replaced when worn out by simply removing the bolts 11 lifting the receptacle 6 from the annular base or ring 10, insert a new screen, replace the receptacle 6 and the bolts 11 as before.

When it is desired to use the sifter, it is brought into the house, the lid or cover removed, the ashes put into the receptacle 6, the lid or cover 8 replaced, and the gyratory motion applied to the receptacle 6. The ashes will pass through the screen 9 into the receptacle 1, leaving the coarse particles of unconsumed coal in receptacle 6, which can be put back in the stove or removed, as desired.

By the use of this device the ashes can be sifted in the house, if desired, as it is entirely dust-proof, owing to the parts all fitting snugly together, and is noiseless, owing to the roller-bearings in addition to the other advantages arising from the improvements therein.

In Fig. 4 I have shown a modification in which the antifriction-bearings 5 are placed on the inside of the receptacle 1 instead of the ring 10, as shown in the other figures. The base or ring in this modification is provided with one flange 20 instead of the two flanges, as in the remaining figures. In this modification the flange 20 rests upon the antifriction-bearing 5.

Having thus described my invention, what I claim as new, and desire to secure by Letters Patent, is—

1. In an ash-sifter, the combination with the receptacle 6, of the base or ring, 10, having projecting flanges, 20, 21, forming an annular groove, 22, the antifriction-bearings, 5, secured in said groove, the screen, 9, secured to the base or ring, and receptacle, 1, provided with the guideway, 4, over which the said groove fits and on which said bearings rest.

2. In an ash-sifter, the combination of the receptacle 1; the receptacle, 6; the screen, 9; the base or ring, 10, having flanges, 20, and 21 resting upon the upper edge of the receptacle, 1; and the hook-headed bolts, 11, to draw the screen taut and hold jointly the base 10 and screen, 9, to the receptacle, 6.

3. In an ash-sifter, the combination with the receptacle 6, of the base or ring, 10, having projecting flanges 20, 21, forming an annular groove, 22, the antifriction-bearings, 5, secured in the groove 22, the screen, 9, secured to the base or ring, and receptacle, 1, over which the said groove fits.

4. In an ash-sifter, the combination with the receptacle 6, of the base or ring, 10, having projecting flanges 20, 21 and 23; the removable screen, 9; hook-headed bolts, 11, having one end engaging the screen, 9, and the opposite end passing through the receptacle, 6, and the flange 23 of the base or ring, 10; and the receptacle, 1, over which the flanges 20 and 21 of the base 10 fit.

5. In an ash-sifter, the combination with the receptacle 6 of a base or ring, 10, having projecting flanges 20, 21 and 23; antifriction-bearings, 5, between the flanges 20 and 21; the removable screen, 9, held in position by the hook-headed bolts, 11, engaging the screen and passing through the receptacle, 6, and the flange, 23 of the base or ring, 10; and the receptacle, 1, over the upper edge of which flanges 20 and 21 project and on which the said bearings rest.

6. In an ash-sifter, the combination of the receptacle 1; the receptacle, 6, adapted to be revolved upon the receptacle 1; a base or ring secured to the lower end of the receptacle 6; a removable screen, 9, secured to the said base or ring; hook-headed bolts, 11, engaging the screen and holding jointly the screen and ring, or base, to the lower end of the receptacle, 6; and antifriction-rollers between the receptacles 1 and 6.

In testimony whereof I affix my signature in the presence of two witnesses.

ISAIAH H. TAYLOR.

Witnesses:
THOS. C. BAILEY,
WM. BRANDT.